United States Patent [19]

Sundin

[11] 3,957,554

[45] May 18, 1976

[54] ATTACHMENT OF NET TO NON-WOVEN BLANKET WITHOUT ADHESIVE

[75] Inventor: George Holger Sundin, Duluth, Minn.

[73] Assignee: Conwed Corporation, St. Paul, Minn.

[22] Filed: Dec. 23, 1974

[21] Appl. No.: 535,279

Related U.S. Application Data

[63] Continuation-in-part of Ser. No. 363,510, May 24, 1973, abandoned.

[52] U.S. Cl. .................................. 156/62.6; 156/281; 156/324; 162/205; 428/91; 428/236; 428/284
[51] Int. Cl.² ........................ B32B 31/00; B32B 5/02
[58] Field of Search .................. 161/79, 80, 87, 89, 161/152, 153, 157, 114, 62–67, DIG. 6; 28/72 R, 72 NW, 72.2 R; 428/236, 255, 284, 256, 288, 289; 162/108, 112, 205; 156/176, 178, 283, 324, 62.6, 281

[56] References Cited

UNITED STATES PATENTS

| | | | |
|---|---|---|---|
| 2,330,814 | 10/1943 | Drew | 162/108 |
| 2,827,411 | 3/1958 | Cole | 161/DIG. 6 |
| 3,102,837 | 9/1963 | Griswold | 162/108 |
| 3,129,466 | 4/1964 | L'Hommedieu | 162/108 |
| 3,348,993 | 10/1967 | Sissons | 161/64 |

Primary Examiner—George F. Lesmes
Assistant Examiner—P. J. Thibodeau
Attorney, Agent, or Firm—Eyre, Mann & Lucas

[57] ABSTRACT

A method for attaching plastic nets to non-woven blankets without use of adhesives is disclosed. The net is positioned adjacent the non-woven blanket and then the strands of the netting are vibrated causing surface fibers of the blanket to surround the strands and hold the net to the blanket without the use of adhesives.

6 Claims, 3 Drawing Figures

ATTACHMENT OF NET TO NON-WOVEN BLANKET WITHOUT ADHESIVE

The present application is a continuation-in-part of application Ser. No. 363,510 filed May 24, 1973 now abandoned.

The present invention relates to the affixing of nets to non-woven blankets without the necessity for using adhesive materials.

Non-woven blankets, which comprise fibers held together by a binder, have a wide variety of uses in industry including use as mattress padding, air conditioner filters, and a variety of other well known applications. However, non-woven blankets have the inherent disadvantage that they are not very strong and particularly that they do not have much tear resistance. In order to compensate for this while still maintaining the good properties of the non-woven blankets the blankets usually have a reinforcing member laminated to them. One of the most frequently used materials for lamination to the non-woven blankets has been thermoplastic net. While this can greatly improve the properties of the non-woven blanket, it also adds considerable cost and one of these costs is the adhesives to affix the net to the non-woven blanket. Adhesives which are effective in bonding thermoplastic net to fibers (e.g., polyvinyl acetate, methyl methacrylate, etc.) are unfortunately very expensive as compared to the binders used for the non-woven blanket e.g., starch, carboxy methyl cellulose, etc. In addition to the cost of adhesives itself, other problems created by the use of adhesives for affixing the net to the non-woven blanket are that the adhesive frequently sticks to the applicator rolls, cut-off knives and associated equipment thereby causing numerous and costly delays. Furthermore, the equipment for applying adhesives can require a fairly substantial capital investment. Also, adhesive application inherently involves additional expense under the new environmental laws and regulations to prevent pollution of the environment by run-off of adhesives, clean-up and the like.

In accordance with the present invention, these disadvantages are eliminated by affixing the net to the non-woven blanket without the use of adhesives. The applicant has found that the surface of non-woven blankets can be disrupted as for example by vibration and that the fibers thus disrupt and tend to overlay strands of a net which is positioned adjacent to the non-woven blanket. These fibers will then hold the net firmly to the blanket without the use of adhesives, i.e., without adhesive bond between the blanket fibers and the strands of the net.

Non-woven blankets are well known in the art and the formation thereof if not a part of this invention. The present invention is applicable to any non-woven blanket net fibers. Typical of such non-woven blankets are felt, fiberglass, cotton, wood fiber and the like. Each of these non-woven blankets is formed by fibrillating the material and then forming the blanket by suitable means, e.g., the methods taught in U.S. Pat. Nos. 3,268,954; 3,081,207; 3,042,977; 2,646,381 and 2,544,019 among others. The essential feature of the blanket is that it is non-woven and is composed of fibers.

The net to be adhered to the non-woven blanket may be any net which has perforations therein. Suitable plastic nets for this purpose are disclosed in U.S. Pat. Nos. 2,361,369; 2,919,467; 3,252,181; 3,587,281; 3,700,521; and 3,384,692. The preferred net for use in this invention is net such as disclosed in U.S. Pat. No. 3,252,181 and commonly referred to as square mesh net. It will be understood, however, that the invention is not limited to the nets disclosed in these particular patents and that any net material can be used so long as it is in the nature of a perforated sheet.

In the drawings there is shown the way that net produced according to U.S. Pat. No. 3,252,181 and thereafter biaxially oriented can be affixed to a non-woven blanket of wood fibers, preferably aspen.

In the drawings, where like numbers refer to like parts:

Figure 1:
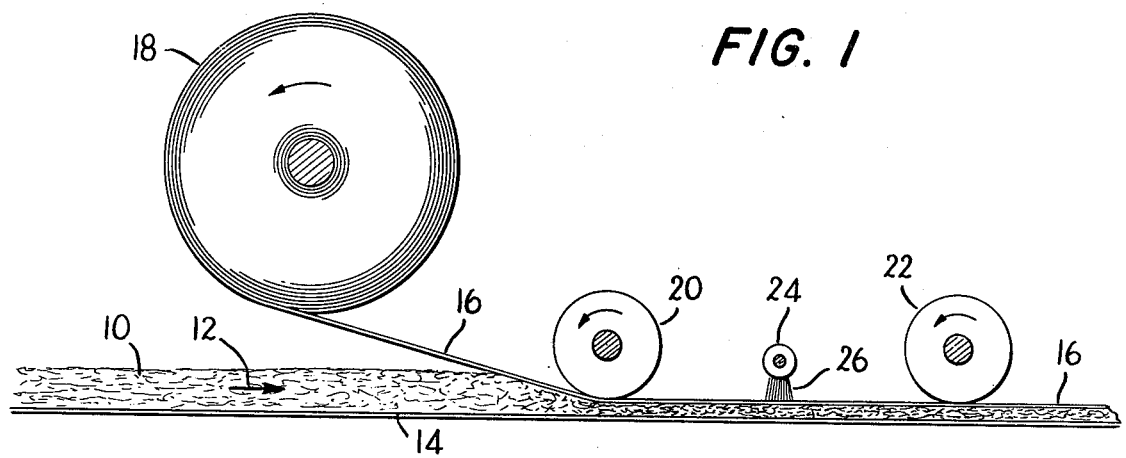
FIG. 1 shows the affixing of net to the top of a non-woven blanket.

Referring now to FIG. 1, a non-woven blanket 10 is proceeding in the direction of arrow 12 along a forming wire 14 on which the non-woven blanket was made in a prior apparatus (not shown). The apparatus as shown is a continuous method of applying net to the blanket just after the net is formed. It is necessary that the net be affixed to the blanket before the blanket binder is set in order to obtain the advantages of the present invention.

The blanket proceeds along forming wire 14 and the net 16 from roll 18 is brought adjacent to the formed blanket and in contact therewith. In the illustration shown, press rolls 20 and 22 are employed for compressing the blanket 10 which has just been formed. As the net 16 and the blanket 10 advances, they are brought into contact with a brush 24. The brush 24 has bristles 26 thereon which protrude through the perforations vibrating the transverse strands of the net and disrupting the surface fibers of the blanket 10. The surface fibers will then overlap the strands of the net thereby causing bonding of the net to the blanket by the strands and without the use of adhesives, i.e., without adhesive bond between the blanket fibers and the strands of the net. When the binder is then set, the position of the overlapping strands will be fixed. It will be understood that the press rolls are only employed where it is desired to compress the blanket and that they are not a necessary part of the invention. The invention will work quite well with or without press rolls. In light of this, it will be understood that brush 24 could be positioned before press roll 20 or after press roll 22 if desired.

Figure 2:
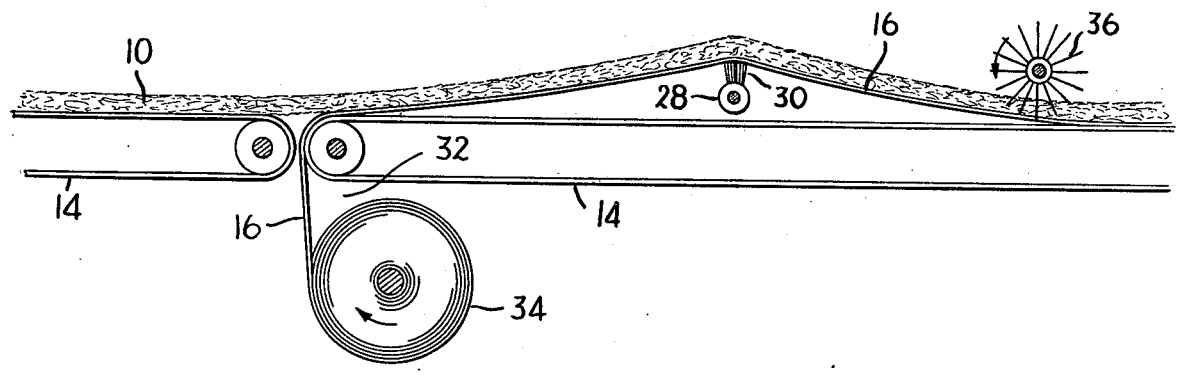
FIG. 2 shows the affixing of net to the bottom of a non-woven blanket.

This may be better understood with respect to FIG. 2 wherein the brush 28 with bristles 30 is positioned below the blanket and no press rolls are employed. The blanket 10 advances along forming wires 14. There is a break in the forming wires at 32 to permit introduction of the net 16 from roll 34. As in FIG. 1, the net is adhered to the blanket by means of disruption of the fibers by the vibrating action set up in the net due to the contacting of the net with the bristles 30 of the brush 28. As the fibers protruding through the net pass the brush, they are also wiped around the cross-strands thus surrounding them.

The means for vibrating the net so that the surface fibers of the blanket are disrupted and overlap the net is not critical so long as the desired result is obtained. However, it is preferred that disruption be from the net side of the blanket so that only the surface of the blanket is disrupted. A brush-like device with stiff bristles such as of wire or nylon has been found suitable and inexpensive for the purpose. The brush may either be stationary as shown or it can be rotating preferably in countercurrent direction, for further disruption of the surface fibers of the non-woven blanket. While not as desirable, surface disruption could be effected from the opposite side of the blanket e.g., by a rotating spiked member such as 36 which operates from the opposite side of the blanket by pushing through the blanket to disrupt the surface fibers adjacent the net. Other means of disrupting the surface fibers of the net such as needles, rakes, air jets, etc. will be readily apparent to those skilled in the art.

Figure 3:
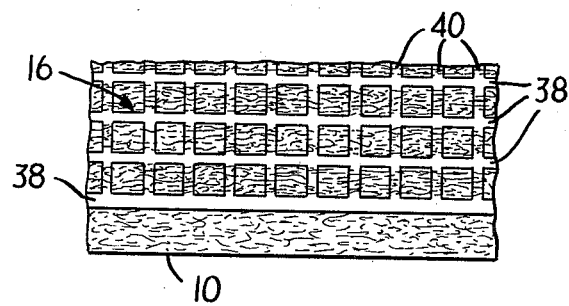
FIG. 3 shows the finished product.

In FIG. 3 is shown a portion of the finished product. The plastic net 16 with longitudinal strands 38 and transverse strands 40 is shown affixed to the non-woven blanket 10. As shown, the fibers overlap only the transverse direction strands 40. The reason for this is that the fibers have only been disrupted in the transverse direction by the brush 24 or 28 of FIGS. 1 and 2 respectively. It will be understood, however, that the fibers could also cover the longitudinal strands 38 if the brush were oscillated back and forth as the net and the blanket advanced.

It will be understood that the claims are intended to cover all changes and modifications of the preferred embodiments of the invention herein chosen for the purpose of illustration, which do not constitute departures from the spirit and scope of the invention.

What is claimed is:

1. A method of affixing net to a non-woven blanket of fibers comprising:
   a. forming a non-woven blanket comprising fibers and a binder for the fibers;
   b. before the binder is set,
      i. contacting at least one side of the said blanket with a plastic net;
      ii. disrupting the surface fibers of the non-woven blanket with a brush positioned on the same side of the blanket as the net to cause at least some of the surface fibers to overlap at least some of the strands of the net;
   c. setting the binder to cause the fibers to assume a fixed position whereby the net is affixed to the blanket due to the fixed position of the fibers which overlap strands of the net and without adhesive bond between the blanket fibers and the strands of the net.

2. The method of claim 1 wherein the non-woven blanket comprises wood fibers.

3. The method of claim 1 wherein the net comprises thermoplastic net.

4. The method of claim 3 wherein the net comprises longitudinal and transverse strands.

5. The method of claim 1 wherein the non-woven blanket is pressed before the surface fibers are disrupted.

6. The method of claim 1 wherein the combination of the net and the non-woven blanket are pressed after the surface fibers are disrupted.

* * * * *